United States Patent
Berman et al.

(10) Patent No.: US 6,940,683 B2
(45) Date of Patent: Sep. 6, 2005

(54) MATCHED FILTER DETECTION FOR TIME BASED SERVO SIGNALS IN A TAPE DRIVE

(75) Inventors: David Berman, San Jose, CA (US); Nhan Xuan Bui, Tucson, AZ (US); Michael Constantin Melas, Los Gatos, CA (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/776,300

(22) Filed: Feb. 10, 2004

(65) Prior Publication Data

US 2005/0174681 A1 Aug. 11, 2005

(51) Int. Cl.[7] .............................................. G11B 5/584
(52) U.S. Cl. .................................................. 360/77.12
(58) Field of Search ...................................... 360/77.12

(56) References Cited

U.S. PATENT DOCUMENTS

| 6,031,672 A | 2/2000 | Bergquist et al. ............. 360/46 |
| 6,122,124 A | 9/2000 | Fasen et al. .................. 360/51 |
| 6,222,691 B1 | 4/2001 | Berquist et al. ............. 360/46 |
| 6,762,900 B2 * | 7/2004 | Bui et al. ................. 360/77.12 |
| 2003/0058562 A1 | 3/2003 | Kuld et al. .................... 360/51 |

* cited by examiner

*Primary Examiner*—David Hudspeth
*Assistant Examiner*—Mitchell Slavitt
(74) *Attorney, Agent, or Firm*—Allen K. Bates

(57) ABSTRACT

Disclosed are a system, a method, and article of manufacture to provide for filtering a servo signal in a tape drive using a matched filter that is optimized for the operating tape velocity of the tape drive. A servo controller for track following on a tape uses a digital filter implementation of the matched filter to produce a filtered servo signal. The digital filter is optimized for different tape velocities by selecting digital filter coefficients for the digital filter that depend upon the tape velocity presently in use. The filtered servo signal is used by the servo controller to provide improved track following in a tape drive.

28 Claims, 4 Drawing Sheets

MATCHED FILTER DETECTION FOR TIME BASED SERVO SIGNALS IN A TAPE DRIVE

TECHNICAL FIELD

The present invention relates to servo systems for positioning tape heads laterally with respect to longitudinal servo bands of a magnetic tape, and, more particularly, to filtering time based servo signals to improve servo performance.

BACKGROUND OF THE INVENTION

Magnetic tape provides a means for physically storing data. As an archival medium, tape often comprises the only copy of the data. The tape is typically made as thin as practically possible to maximize the length of a tape stored on a tape reel, and thereby maximize the amount of data that can be stored on the tape contained in a single cartridge. A tape drive is used to store and retrieve data with respect to the magnetic tape. An example of a tape drive is the IBM TotalStorage Enterprise Tape Drive 3592 manufactured by IBM Corporation. Tape drives are typically used in combination with an automated data storage library. For example the IBM TotalStorage Enterprise Tape Library 3494 manufactured by IBM Corporation is an automated data storage library that may include one or more tape drives and data storage media for storing data with respect to the tape drives.

Magnetic tape comprises a medium for storing large amounts of data, and typically comprises a plurality of parallel data tracks that extend longitudinally along the tape. A tape head is employed for reading and/or writing data on the data tracks, and is typically shared between various data tracks or groups of data tracks, and is moved between data tracks or groups of data tracks in the lateral direction of the tape. The tape head typically comprises a number of separate data transducers which read and/or write data with respect to a number of parallel longitudinal data tracks. Servo systems are provided to position tape heads laterally to position data transducers over the desired data tracks and to then maintain alignment of the data transducers with respect to the desired data tracks, as the magnetic tape is moved longitudinally with respect to the tape head. The tape head is provided with one or more separate servo transducers, which are offset from the data transducers, so as to maintain tape head alignment by track following a servo band of the magnetic tape. A servo transducer is guided along any of several paths within the band, called "index positions", and the tape head is repositioned laterally within a servo band so that the data transducers access different data tracks. The servo bands may be continuously variable laterally to provide a servo signal which varies continuously as a function of the lateral position of the servo transducer, allowing a calculation of a Position Error Signal, or "PES".

One type of servo system for magnetic tape media is one in which a plurality of separate servo bands are laterally positioned on the magnetic tape media. Each of the servo bands provides the servo guidance for a group of data tracks, and the servo transducer of the tape head is repositioned laterally within a servo band so the data transducers access different data tracks, and is repositioned laterally to another servo band to access still further data tracks. In one example, the servo bands are spaced apart and the data tracks are located between the servo bands. To insure that the servoing is precise, two servo transducers may be provided at either end of the tape head, straddling the data transducers. The lateral position information may be obtained from either or both servo bands. The servo bands may be encoded with essentially identical patterns for determining lateral position, such that the bands are substantially interchangeable from the point of view of calculation of the PES, or both may be used (e.g. averaged).

The lateral positioning of the tape head is typically accomplished by actuators, which may have mechanical or electromechanical components. Once the proper lateral positioning of the servo transducer of the tape head over a servo band has been accomplished, as the servo information being sensed by the servo transducer indicates, minor adjustments of the tape head may be made to track follow lateral movement of the tape or of the servo bands on the tape.

The track following servo control system depends upon an accurate PES. In a time based servo signal, the PES signal is derived from timing information present in the servo signal. A description of a time based servo system is contained in U.S. Pat. No. 6,462,904, Entitled "Timing Based Servo System for Magnetic Tape Systems". Noise, signal disturbances and tape signal dropouts due to media defects may corrupt the PES resulting in tape head position errors. In addition, the tape drive may be operated at different tape velocities resulting in a different spectrum in frequency space for the servo signal. To improve the performance of the servo control system a filter is needed that is optimized for each tape velocity that the tape drive may operate at. Therefore there is a need for an improved filter to provide an improved PES to the servo control system.

SUMMARY OF THE INVENTION

Broadly defined, the present invention provides a system and a method for filtering a servo signal in a tape drive using a matched filter that is optimized for the operating tape velocity of the tape drive to reduce the noise in the servo signal and improve the operation of the track following servo system.

In system embodiments the present invention provides a system for controlling the position of a tape head relative to a tape, comprising: an actuator for moving the tape head; a servo controller for controlling the actuator, comprising: a servo sensor for obtaining the servo signal; a tape velocity sensor for measuring the tape velocity; a processing element coupled to the velocity sensor, wherein the processing element selects digital filter coefficients that depend upon the tape velocity; and a digital filter coupled to the processing element, wherein the digital filter filters the servo signal using the digital filter coefficients to produce a filtered servo signal for use by the servo controller to control the position of the tape head relative to the tape.

In method form, exemplary embodiments include a method for filtering a servo signal in a tape drive, wherein the tape drive comprises a servo controller for track following on a tape, where said method comprises the steps of: obtaining the servo signal; determining a tape velocity; selecting digital filter coefficients that depend upon the tape velocity; and filtering the servo signal using the digital filter coefficients in a digital filter to produce a filtered servo signal.

In still another exemplary method, the present invention includes a method for filtering a servo signal in a tape drive, wherein the tape drive comprises a servo controller for track following on a tape, where said method comprises the steps of: obtaining the servo signal; determining the tape velocity; operating the tape drive at a specified tape velocity; processing the servo signal to obtain an average servo signal; determining the values of the digital filter coefficients by sampling a portion of the average servo signal at equally spaced intervals to provide a matched digital filter for the specified tape velocity; selecting digital filter coefficients that depend upon the tape velocity; and filtering the servo signal using the digital filter coefficients in a digital filter to produce a filtered servo signal.

It will be appreciated by those skilled in the art that although the following detailed description will proceed with reference being made to preferred embodiments and methods of use, the present invention is not intended to be limited to these preferred embodiments and methods of use. Rather, the present invention is intended to be limited only as set forth in the accompanying claims.

For a more detailed understanding of the present invention, reference may be made to the following detailed description taken in conjunction with the accompanying drawings.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
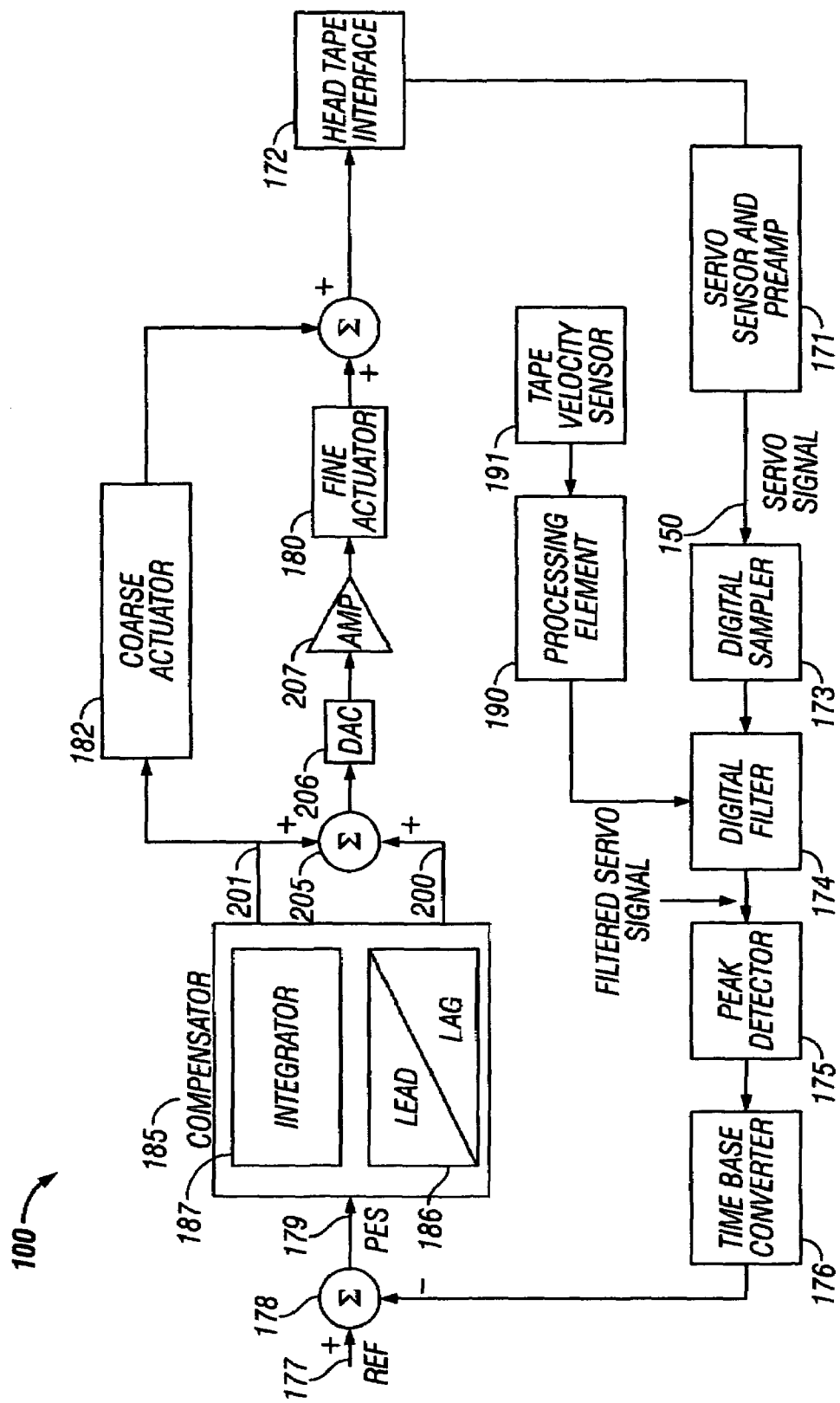
FIG. 1 is a diagram of a track following servo controller for controlling the position of a tape head relative to a tape.

FIG. 1 is a block diagram of a portion of a servo controller 100 for a track following servo system in a data storage tape drive in which the present invention may be incorporated. A description of a track following servo system for use with the present invention is disclosed in U.S. Pat. No. 6,462,904. It will be appreciated by those skilled in the art that although the following detailed description proceeds with reference being made to a magnetic tape drive with a time based servo system, the present invention is not intended to be limited to a magnetic tape drive with a time based servo system. Rather, the present invention may be used with optical tape or other tape that may be used in any tape drive with any type of servo system.

Figure 3:
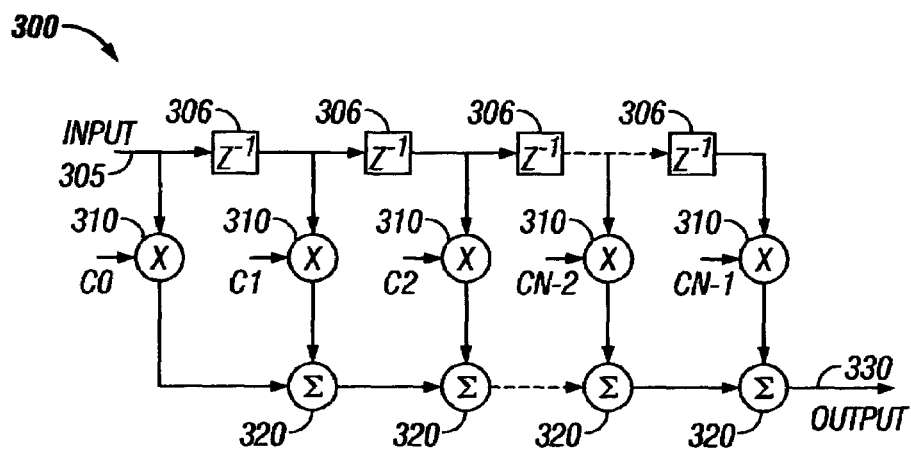
FIG. 3 is a block diagram of a digital filter that may be used with the present invention.

With reference to FIG. 1, the tape head signals are sensed by servo sensor and preamp 171 to produce a servo signal 150 from head to media interface 172. Servo signal 150 from servo sensor and preamp 171 is sampled by digital sampler 173 and filtered by digital 174 and then provided to peak detector 175. Servo signal 150 from servo sensor and preamp 171 is sampled by digital sampler 171 at a fixed sampling rate that does not vary with the tape velocity. The sampling of servo signal 150 by digital sampler 173 produces a digital representation of servo signal 150 that is suitable for processing by a digital processing apparatus, for example a central processing unit or a digital filter. Digital filter 174 receives the digital representation of servo signal 150 produced by digital sampler 171 and performs filtering operations to remove unwanted noise from servo signal 150 to produce a filtered servo signal. FIG. 3 shows one example of a Finite Impulse Response (FIR) digital filter 300 that may be used for digital filter 174. Digital filter 300, may be implemented in code, logic, hardware logic (e.g., an integrated circuit chip, Programmable Gate Array (PGA), Application Specific Integrated Circuit (ASIC), etc.) One skilled in the art will recognize that other types of digital filters may be used with the present invention without deviating from the scope of the invention. FIR digital filter 300 has an input 305 that accepts a sampled version of servo signal 150 and an output 330 that produces a filtered version of servo signal 150 to peak detector 175. The filter comprises a series of time delay elements $Z^{-1}$ 306, multipliers 310 for multiplying digital filter coefficients $C_0, C_2, C_3, \ldots C_{N-2}$ and $C_{N-1}$ and summers 320. In the preferred embodiment, FIR digital filter 300 comprises a seventeen stage digital filter resulting in N=17, however N may vary depending upon the system used and the performance desired. The seventeen digital filter coefficients $C_0, C_2, C_3, \ldots C_{15}$ and $C_{16}$ are determined by obtaining seventeen equally spaced samples of a portion of each average servo signal 160 (explained below) that are symmetrical about the horizontal center point for each tape velocity.

Digital filter 174 is controlled by processing element 190. Processing element 190 may comprise a central processing unit (CPU), an alternative digital processing apparatus, ASIC, dedicated logic circuitry, etc., or a combination thereof. Tape velocity sensor 191 senses and provides the tape velocity to processing element 190. Processing element 190 provides digital filter coefficients to digital filter 174 and enables or disables digital filter 174 depending upon the condition of the tape velocity. Digital filter 174 provides a filtered servo signal 150 to peak detector 175. Peak detector 175 determines the location in time of the peaks of the filtered servo signal 150. Time base converter 176 receives the output from peak detector 175 and converts the signal into a position signal for input to compensator 185. In the preferred embodiment, the output signal from peak detector 175 goes high on a positive-going transition (leading edge) and goes low on a negative-going transition, permitting time base converter 176 to distinguish between the two polarities. As noted above, the position signal is generated by time base converter 176. The function of time base converter 176 is to perform the necessary calculations to make the position signal available to the remainder of the servo control system. Time base converter 176 uses a crystal oscillator as a reference to accurately measure the time between peaks to derive a position signal. The position signal is then compared to a reference signal 177 by a comparator 178 to determine position error between the head and a desired position related to the defined servo tracks, called the "position error signal", or "PES", on line 179.

A compound actuator is used to position the tape head relative to the tape. An example of the use of a compound actuator in a tape drive is described in U.S. Pat. No. 6,587,303: entitled "Servo Control of a Coarse Actuator". In the typical compound actuator, the fine actuator 180 follows the track guiding disturbances, as determined by the PES, to position the data head in the center of the data track or tracks. It has relatively small mass and wide bandwidth and is thus able to follow high frequency disturbances. However, it has a very limited range of travel in order to provide the high bandwidth. The coarse actuator 182 carries the fine actuator from track to track in accordance with a seek function. The fine actuator servo system typically has a compensator function 185 in the position error signal loop, which is designed to enable maximum bandwidth with adequate stability margins.

The compensator function 185 modifies the PES signal by applying a variable gain to the PES signal, which gain is based upon the frequency of the input PES signal 179, or, from another viewpoint, upon the rates of change of the input PES signal. The compensator function 185 includes an integrator 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function. This results in an integration function signal on connection 200, and the lead/lag gain as applied to the PES results in a signal on line 201. The signals are summed by a summer 205 and, if digital, are supplied to a digital to analog converter 206. A power amplifier 207 then applies the signal to the fine actuator 180, operating the fine actuator to translate the head in a manner to reduce the determined position error. Alternatively, a digital driver may be employed to operate the fine actuator 180. The result is that the servo controller uses the position error signal to control the position of a tape head relative to the tape by controlling coarse actuator 182 and/or fine actuator 180. With the present invention, servo controller 100 derives the PES from the filtered servo signal and servo controller 100 uses the PES to control the position of the tape head relative to the tape.

Figure 2:
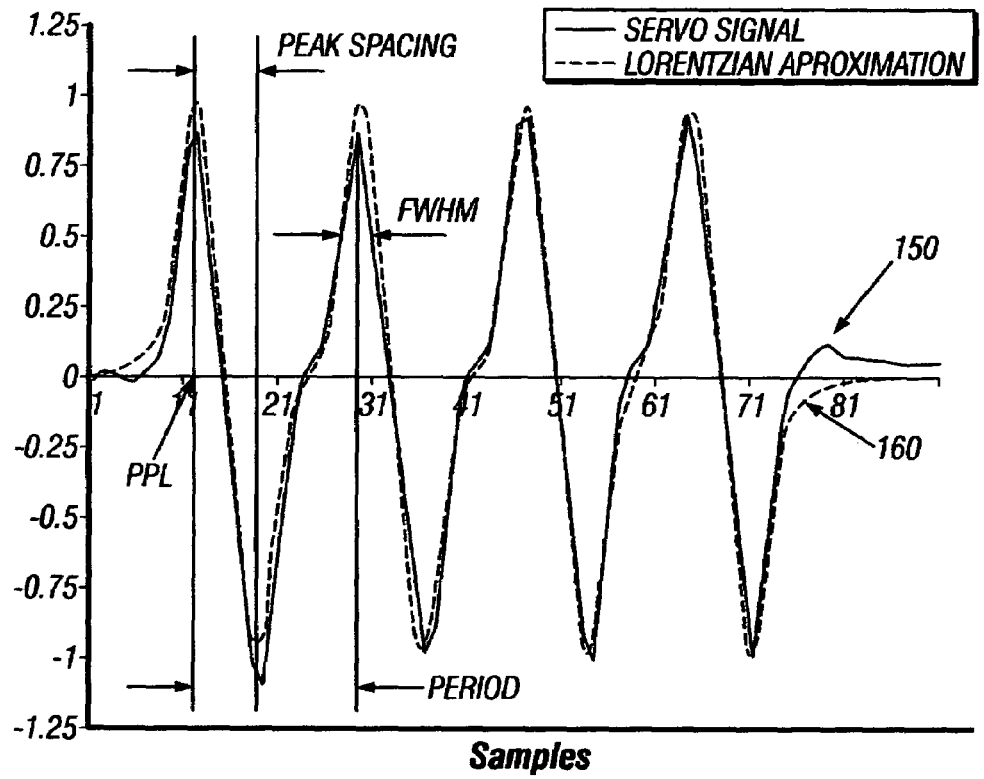
FIG. 2 is a graph of a servo signal (solid line) and a Lorentzian approximation (dotted line) to the servo signal.

FIG. 2 shows an example of a servo signal 150 that may be obtained from the output of pre-amp 171. Also shown in FIG. 2 is an average servo signal 160 obtained by using a lorentzian function approximation to servo signal 150 (explained below). Servo signal 150 is corrupted by noise resulting in an asymmetric waveform with a variation in the amplitude of the positive and negative peaks as a function of time. The Lorentzian function used for the Lorentzian function approximation to servo signal 150 may be described by the following equation: $L(t)=1/(1+(t/p)*2)$, where $L(t)$ is the Lorentzian function, t is time, and p is the half width at half amplitude.

Figure 4:
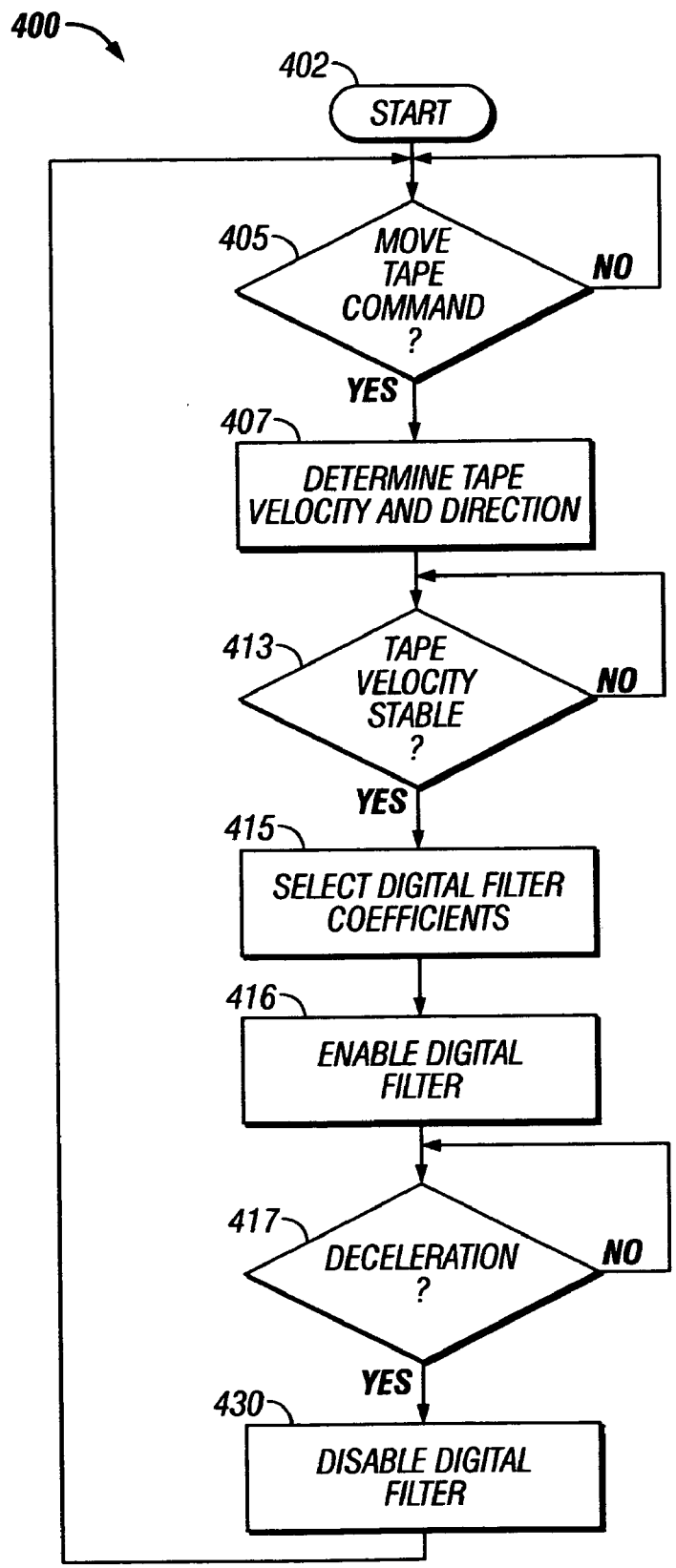
FIG. 4 shows a flowchart of steps to implement the present invention.

The method of a first embodiment can be better understood by referring to flowchart 400 shown in FIG. 4 and the block diagram of servo controller 100 shown in FIG. 1. At step 405 the system waits for a tape move command. If the tape move command is active then control transfers to step 407, otherwise the system continues to wait for a tape move command. A tape move command is used for example to move the tape to a specified place to read, write or verify data. At step 407 the tape velocity and tape direction are determined. The tape velocity and tape direction may be determined for example by a measurement from tape velocity sensor 191 and processing element 190. Alternatively other means may be used to determine the tape velocity and direction. For example, a separate sensor for tape velocity and tape direction may be used, tape velocity and tape direction may be determined from other elements, etc. At step 413 the tape velocity is examined to determine if the tape velocity is stable. Tape velocity stability may be accomplished by monitoring the tape velocity for a specified period of time to detect any significant changes in velocity relative to proper operation conditions. If the tape velocity is within a specified operation tolerance for proper operation of the tape drive then control is transferred to step 415. At step 415 digital filter coefficients are selected for digital filter 174. The digital filter coefficients selected for digital filter 174 depend upon the tape velocity and tape direction determined at step 413 and an average servo signal 160. The digital filter coefficients are predetermined by analysis of average servo signal 160 at each tape velocity that the tape drive is expected to operate at.

To determine the digital filter coefficients, a servo signal 150 is obtained and processed to obtain an average servo signal 160. FIG. 2 shows an example of a portion of a servo signal 150 (solid line) that may be obtained at a specified tape velocity and a portion of the corresponding average servo signal 160. Many different methods may be used to determine an average servo signal 160 from servo signal 150 without deviating from the scope of the present invention. In the preferred embodiment a Lorentzian function is used to approximate servo signal 150 to produce the corresponding average servo signal 160. In the preferred embodiment a large enough number of servo signals 150 are obtained from one or more tape drives to provide a statistically significant sample set. From the sample set, the Average Full Width Half Maximum (AFWHM) of the positive and negative peaks is determined by averaging many samples of individual positive and negative peak FHWM values. An example of the FHWM of one positive peak of servo signal 150 is labeled as "FWHM" in FIG. 2. The average space between positive and negative peaks is also determined from the sample set by averaging many samples of individual positive and negative peak spacing values to provide an average peak spacing, PS. An example of the peak spacing between a positive peak and a negative peak of servo signal 150 is labeled as "peak spacing" in FIG. 2. The average period, P, defined as the spacing between consecutive positive peaks is also determined from the sample set by averaging many period samples. An example of the period of servo signal 150 is labeled as "period" in FIG. 2. From the average values of the FWHM, peak spacing and period, a Lorentzian function approximation may be determined by combining a series of Lorentzian functions. For example, the Lorentzian function approximation described by the following equation: $Lapp(t)=L(t-ppl)-L(t-ppl-PS)+L(t-ppl-P)-L(t-ppl-2*PS)+L(t-ppl-2*P)$, where $L(t)=1/(1+(t/p)*2)$ is the Lorentzian function described above, ppl is the location of the first positive peak (as shown in FIG. 2), and $2p=$ AFHWM. Using the parameters 2p=AFWHM=4, ppl=11.7, PS=7 and P=17.4, where t equals the sample number, the Lorentzian function approximation (dashed line) results in average servo signal 160 shown in FIG. 2.

Figure 5:
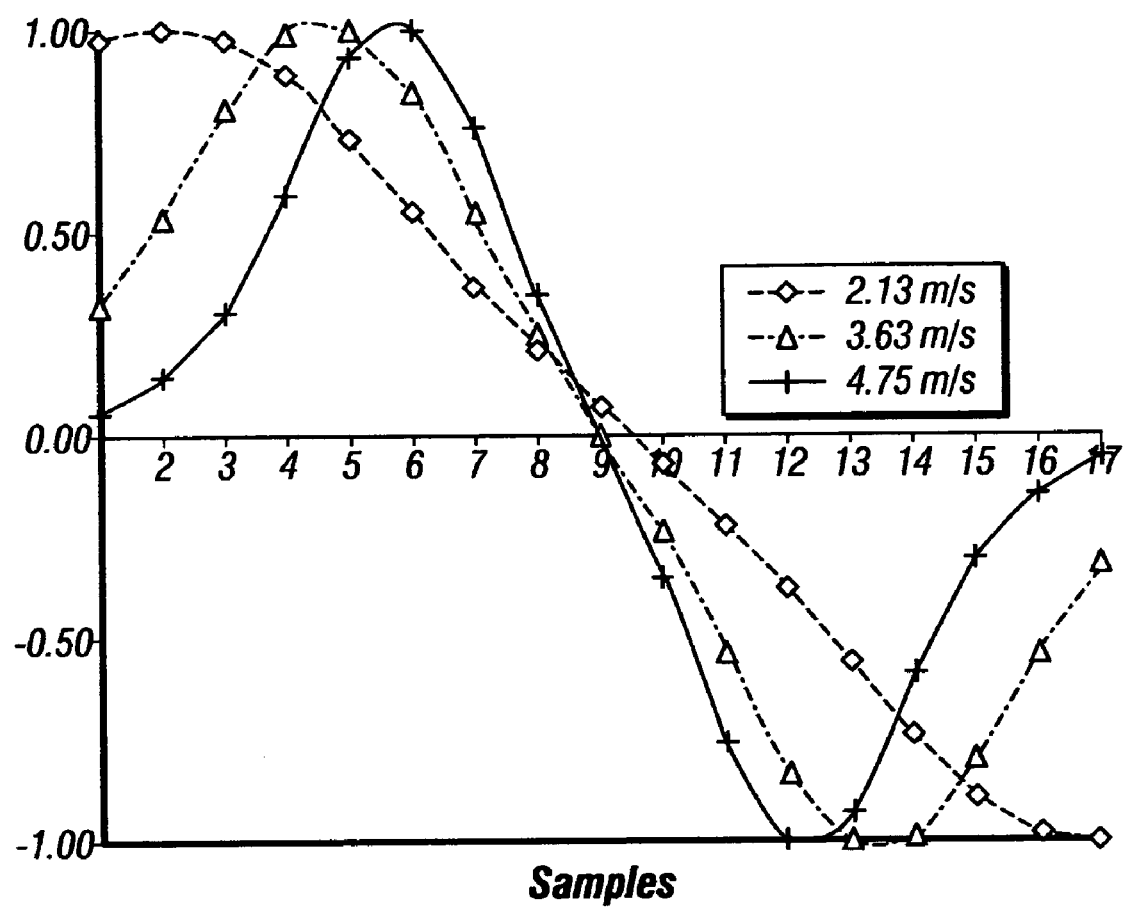
FIG. 5 is a graph of digital filter coefficients for a multiple stage digital filter that may be used with the present invention.

After determining average servo signal 160 the digital filter coefficients may be determined by sampling the average servo signal 160 at N equally spaced sample points that are symmetrical about the horizontal center point, where N is the order of the digital filter used. FIG. 5 shows one example of filter coefficients that may be obtained using the process described above for a 17 order digital filter. The solid curve labeled "4.75" is a graph of average servo signal 160 for a tape velocity of 4.75 meters/second. The N=17 equally spaced sample points are shown by the "+" marks on the graph. The values obtained for the seventeen digital filter coefficients $C_0, C_2, C_3, \ldots C_{N-2}$ and $C_{N-1}$ for a tape velocity of 4.75 meters/second are shown in column 2 of Table 1. With a fixed sampling rate, lower tape velocities will result in an average servo signal 160 that appears expanded in the horizontal direction as shown by the long dashed curve labeled "3.63 m/s" and the short dashed curve labeled "2.13 m/s". The corresponding values for the seventeen digital filter coefficients $C_0$, $C_2$ $C_3$, ... $C_{N-2}$ and $C_{N-1}$ for the 3.63 m/s and 2.13 m/s tape velocities are listed in the third and fourth columns of Table 1. The digital filter coefficients determined by the process described above result in a matched filter or approximation to a matched filter for each tape velocity. As is known in the art, a matched filter provides an optimized filter for the signal to be filtered.

TABLE 1

Digital filter coefficients for three tape velocities.

| Sample Number | Filter coefficients for a tape velocity of 4.75 meters/second | Filter coefficients for a tape velocity of 3.63 meters/second | Filter coefficients for a tape velocity of 2.13 meters/second |
| --- | --- | --- | --- |
| 1 | 0.06 | 0.32 | 0.98 |
| 2 | 0.14 | 0.54 | 1.00 |
| 3 | 0.31 | 0.80 | 0.98 |
| 4 | 0.59 | 0.99 | 0.89 |
| 5 | 0.93 | 1.00 | 0.73 |
| 6 | 1.00 | 0.84 | 0.55 |
| 7 | 0.76 | 0.54 | 0.37 |
| 8 | 0.35 | 0.25 | 0.21 |
| 9 | 0.00 | 0.00 | 0.07 |
| 10 | −0.35 | −0.24 | −0.07 |
| 11 | −0.76 | −0.54 | −0.22 |
| 12 | −1.00 | −0.84 | −0.38 |
| 13 | −0.93 | −1.00 | −0.56 |
| 14 | −0.59 | −0.99 | −0.74 |
| 15 | −0.30 | −0.80 | −0.89 |
| 16 | −0.14 | −0.54 | −0.98 |
| 17 | −0.06 | −0.32 | −1.00 |

The digital filter coefficients are determined for one or more tape velocities and stored in a memory device that may be accessed by processing element 190. In the preferred embodiment, the digital filter coefficients for one or more tape velocities are stored in an internal memory of processing element 190. Processing element 190 receives the tape velocity and tape direction from velocity sensor 191 and selects the digital filter coefficients for the current tape velocity and tape direction. The tape direction may be either forward or reverse. The digital filter coefficients depend upon the tape direction. For example, for a forward direction, the digital filter coefficients for each tape velocity are selected from Table 1 in the order listed from top to bottom of Table 1. For the reverse direction the order of the digital filter coefficients is reversed resulting in selecting from the bottom to top of Table 1. Forward and reverse tape directions are relative and one skilled in the art having the benefit of this invention will recognize the proper selection of the order of the digital filter coefficients depends upon the polarity of servo signal 150. The digital filter coefficients are predetermined as explained above to provide a matched filter or an approximation to a matched filter for each tape velocity. After selection of the digital filter coefficients to match the tape velocity at step 415, processing element 190 provides digital filter coefficients to digital filter 174 and enables digital filter 174 at step 416. Digital filter 174 is enabled to provide filtering to the sampled servo signal and disabled by allowing the sampled servo signal to pass through digital filter 174 unaffected. Digital filter 174 is enabled until the tape velocity changes as a result of an acceleration or deceleration of the tape. Processing element 190 enables or disables digital filter 174 depending upon the condition of the tape velocity. At step 417 the tape velocity is continually examined to detect any change in the tape velocity and if a deceleration of the tape velocity is detected then control is transferred to step 430. At step 430 digital filter 174 is disabled and control is transferred back to step 405 where the system waits for another tape move command. During operation, servo controller 100 derives the PES from the filtered servo signal and servo controller 100 uses the PES to control the position of the tape head relative to the tape.

It will be appreciated by those skilled in the art that although the invention has been described with reference to a time based servo signal, the present invention is not intended to be limited to time based servo signals. Rather, the present invention may be used with any servo signals that may be used in any tape drive.

The invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

While the preferred embodiments of the present invention have been illustrated in detail, the skilled artisan will appreciate that modifications and adaptations to those embodiments may be made without departing from the scope of the present invention as set forth in the following claims.

What is claimed is:

1. A method for filtering a servo signal in a tape drive, wherein said tape drive comprises a servo controller for track following on a tape, where said method comprises the steps of:
   obtaining said servo signal;
   determining a tape velocity;
   selecting digital filter coefficients that depend upon said tape velocity; and
   filtering said servo signal using said digital filter coefficients in a digital filter to produce a filtered servo signal.

2. The method of claim 1, comprising the additional step of:
   said servo controller deriving a position error signal from said filtered servo signal.

3. The method of claim 1, comprising the additional steps of:
   said servo controller deriving a position error signal from said filtered servo signal; and
   said servo controller using said position error signal to control the position of a tape head relative to said tape.

4. The method of claim 1, comprising the additional steps of:
   disabling said digital filter during deceleration of said tape.

5. The method of claim 1, comprising the additional steps of:
   disabling said digital filter during acceleration of said tape.

6. The method of claim 1, wherein the selecting step comprises the additional step of:
   selecting said digital filter coefficients that provide a matched digital filter for said tape velocity.

7. The method of claim 1, wherein the selecting step comprises the additional steps of:
   operating said tape drive at a specified tape velocity;
   processing said servo signal to obtain an average servo signal;
   determining the values of said digital filter coefficients by sampling a portion of said average servo signal at equally spaced intervals to provide a matched digital filter for said specified tape velocity.

8. The method of claim 7, wherein the processing step comprises the additional steps of:
   obtaining an average value of the separation between a positive peak and a negative peak of said servo signal;
   obtaining an average value of a period of said servo signal;
   obtaining an average value of a width of said positive peak of said servo signal;
   determining a lorentzian approximation to said servo signal using said average value of the separation between a positive peak and a negative peak, said average value of a width of said positive peaks and said average value of a period; and
   using said lorentzian approximation to said servo signal as said average servo signal.

9. The method of claim 1, comprising the additional steps of:
   determining a tape direction;
   selecting said digital filter coefficients that depend upon said tape direction.

10. A system for controlling a position of a tape head relative to a tape comprising:
    an actuator for moving said tape head;
    a servo controller for controlling said actuator, comprising:
       a servo sensor for obtaining said servo signal;
       a tape velocity sensor for measuring a tape velocity;
       a processing element coupled to said velocity sensor, wherein said processing element selects digital filter coefficients that depend upon said tape velocity; and
       a digital filter coupled to said processing element, wherein said digital filter filters said servo signal using said digital filter coefficients to produce a filtered servo signal.

11. The system of claim 10, wherein said servo controller derives a position error signal from said filtered servo signal.

12. The system of claim 10, wherein said servo controller derives a position error signal from said filtered servo signal and said servo controller uses said position error signal to control said position of said tape head relative to said tape.

13. The system of claim 10, wherein said digital filter is disabled during deceleration of said tape.

14. The system of claim 10, wherein said digital filter coefficients provide a matched digital filter for said tape velocity.

15. The system of claim 10, further comprising;
    a tape direction sensor, wherein said digital filter coefficients depend upon a tape direction obtained from said tape direction sensor.

16. The system of claim 10, wherein said system is an automated data storage library further comprising a least one tape drive.

17. A servo controller for track following on a tape, comprising:
    a servo sensor for obtaining a servo signal;
    a tape velocity sensor for measuring a tape velocity;
    a processing element coupled to said velocity sensor, wherein said processing element selects digital filter coefficients that depend upon said tape velocity; and
    a digital filter coupled to said processing element, wherein said digital filter filters said servo signal using said digital filter coefficients to produce a filtered servo signal.

18. The servo controller of claim 17, wherein said servo controller derives a position error signal from said filtered servo signal.

19. The servo controller of claim 17, wherein said servo controller derives a position error signal from said filtered servo signal and said servo controller uses said position error signal to control a position of a tape head relative to said tape.

20. The servo controller of claim 17, wherein said digital filter coefficients provide a matched digital filter for said tape velocity.

21. The servo controller of claim 17, wherein said digital filter is disabled during deceleration of said tape.

22. A tape drive comprising:
    a tape head;
    an actuator for moving said tape head;
    a servo controller for controlling said actuator comprising:
       a servo sensor for obtaining a servo signal;
       a tape velocity sensor for measuring a tape velocity;
       a processing element coupled to said velocity sensor, wherein said processing element selects digital filter coefficients that depend upon said tape velocity; and
       a digital filter coupled to said processing element, wherein said digital filter filters said servo signal using said digital filter coefficients to produce a filtered servo signal.

23. The tape drive of claim 22, wherein said digital filter coefficients provide a matched digital filter for said tape velocity.

24. The tape drive of claim 22, wherein said servo controller derives a position error signal from said filtered servo signal and said servo controller uses said position error signal to control a position of said tape head relative to a tape.

25. The tape drive of claim 22, wherein said digital filter coefficients provide a matched digital filter for said tape velocity.

26. The tape drive of claim 22, wherein said digital filter is disabled during deceleration of a tape.

27. The tape drive of claim 22, wherein said digital filter is disabled during acceleration of a tape.

28. The tape drive of claim 22, further comprising;
    a tape direction sensor, wherein said digital filter coefficients depend upon a tape direction obtained from said tape direction sensor.

* * * * *